United States Patent [19]
Croslin

[11] Patent Number: 5,999,103
[45] Date of Patent: Dec. 7, 1999

[54] METHOD AND SYSTEM FOR ASSIGNING SPARE TRANSMISSION LINKS TO RESTORAL ROUTES

[75] Inventor: William D. Croslin, Colorado Springs, Colo.

[73] Assignee: MCI Communications Corporation, Washington, D.C.

[21] Appl. No.: 08/885,712

[22] Filed: Jun. 30, 1997

[51] Int. Cl.⁶ .................................................. H04L 1/00
[52] U.S. Cl. .................. 340/825.01; 370/228; 370/225; 370/248; 395/180
[58] Field of Search ................ 340/825.01, 825.03; 370/221, 223, 216, 225, 252, 227, 248, 228, 231, 329, 351, 238; 395/180, 181, 182.01

[56] References Cited

U.S. PATENT DOCUMENTS

| | | |
|---|---|---|
| 4,577,066 | 3/1986 | Bimonte et al. . |
| 4,920,529 | 4/1990 | Sasaki et al. . |

(List continued on next page.)

FOREIGN PATENT DOCUMENTS

| | | |
|---|---|---|
| 0 494 513 A2 | 12/1991 | European Pat. Off. . |
| WO9510149 | 4/1995 | United Kingdom . |
| WO 95/10149 | 4/1995 | WIPO . |

OTHER PUBLICATIONS

W.D. Grover et al, "Near Optimal Spare Capacity Planning In A Mesh Restorable Network" IEEE GLOBCOM 91, vol. 3, pp. 2007–2008, XP000313750.

R.Dighe et al, "A Link based Alternative Routing Scheme For network Restoration Under Failure" IEEE GLOBCOM 95, vol. 3, pp. 2118–2123, XP00063660.

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Network" IEEE Jan. 1991.

Hasegawa et al. "Dynamic Reconfiguration of Digital Cross– Connect Systems with Network Control and Management" IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management" Sep. 1992.

Newport, et al. "Network Survivability Through Connectivity Optimization" IEEE 1987.

Flanagan et al. "Principles and Technologies for Planning Survivability–A Metropolitan Case Study", IEEE 1989.

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

(List continued on next page.)

*Primary Examiner*—Michael Horabik
*Assistant Examiner*—Anthony A. Asongwed

[57] ABSTRACT

A restoration system for restoring a communications network following a failure of one or more communications network components. The restoration system identifies spare segments and spans of spare segments in the original network configuration, as well as interconnected sub-spans of the identified spans of spare segments. The restoration system assigns a cost to the identified spare spans and spare segments. The costs are based on the cost of connecting a spare span or a segment as part of a restoral route and the cost of fragmenting a spare span. The restoration system uses these assigned costs to select a low cost combination of spare segments and spare spans to use as the restoral route.

18 Claims, 7 Drawing Sheets

U.S. PATENT DOCUMENTS

| | | | |
|---|---|---|---|
| 5,187,740 | 2/1993 | Swaim et al. | 379/209 |
| 5,335,268 | 8/1994 | Kelly, Jr. et al. | 379/112 |
| 5,459,716 | 10/1995 | Fahim et al. | 370/16 |
| 5,463,615 | 10/1995 | Steinhorn . | |
| 5,623,492 | 4/1997 | Teraslinna | 370/468 |
| 5,636,203 | 6/1997 | Shah | 370/244 |
| 5,646,936 | 7/1997 | Shah et al. | 370/228 |

OTHER PUBLICATIONS

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

| Span | Parent Length | Child Length | Middle? | Cost |
|---|---|---|---|---|
| P-1 | 3 | | | 36 |
| C-1-1 | 3 | 1 | F | 69 |
| C-1-2 | 3 | 1 | T | 65 |
| C-1-3 | 3 | 1 | F | 64 |
| C-1-4 | 3 | 2 | F | 50 |
| C-1-5 | 3 | 2 | F | 50 |
| P-2 | 2 | | | 48 |
| C-2-1 | 2 | 1 | F | 62 |
| C-2-2 | 2 | 1 | F | 62 |
| P-3 | 1 | | | 60 |
| P-4 | 2 | | | 48 |
| C-4-1 | 2 | 1 | F | 62 |
| C-4-2 | 2 | 1 | F | 62 |
| P-5 | 1 | | | 60 |
| P-6 | 1 | | | 60 |

Cost for Parent = 60 - [(Length - 1) * 12]

Cost for Child = 60 - [(Length - 1) * 12] + [(Parent Length - Length) * 2] + [1 (if Middle = T)]

FIG. 4

METHOD AND SYSTEM FOR ASSIGNING SPARE TRANSMISSION LINKS TO RESTORAL ROUTES

CROSS-REFERENCE TO RELATED APPLICATIONS

This application is related to the U.S. patent applications entitled "Method and System for Pre-Patching a Communications Network" and "Method and System for Augmenting a Communications Network with Spare Capacity," which are being filed concurrently and are hereby incorporated by reference.

TECHNICAL FIELD

The present invention relates to communications networks and, in particular, to the restoration of communications networks following failure of a network component.

BACKGROUND OF THE INVENTION

Telecommunications carriers (e.g., long distance providers) continually strive to increase the reliability of their communications networks. They do this, in part, by increasing the speed by which they can restore network operation following failure in one or more components of the network. A communications network consists of a collection of transmission links, also known as segments, that are interconnected at network nodes. The segments include transmission lines, fiber optic cables, microwave links, and other such transmission medium. Traffic is transmitted on the network from one endpoint to another endpoint through a current route or "trunk," which is a network path of segments that interconnect the endpoints. The network nodes may serve a variety of functions such as amplifying the network traffic for transmission down the next segment in the route or establishing an interconnection between two segments connected to the node (i.e., a switch). Segments are interconnected by switching nodes to form "spans." The switching nodes can be controlled locally or from a remote computer system to connect or to disconnect segments that are connected to the node.

Unfortunately, the components (e.g., nodes and segments) of the communications network may occasionally fail. For example, a segment that is a buried fiber optic cable may fail as a result of being inadvertently severed by someone digging near the buried cable. If one or more of the cables fail, massive disruption of services to a large number of network customers could result. Therefore, telecommunications carriers strive to quickly and economically route the network traffic around such failed components by establishing a "restoral" route. A restoral route is a path between the endpoints that does not include the failed component. The establishing of a restoral route generally involves: (1) detecting that a component on the current route has failed, (2) identifying the location of the component, (3) selecting a restoral route to bypass the failed component, and (4) implementing the selected restoral route. The reliability of telecommunication networks depends in large part on the ability to detect such failures and implement the restoral route with minimal impact on network customers. A plan that identifies which switching nodes, also referred to as restoration nodes, are to be switched to bypass one or more specific failed components is called a "restoration plan."

Communications networks typically have excess capacity that can be used to bypass a failed component. The segments of a network that are currently being used to bear traffic are referred to as active segments, and the segments that are not being currently used to bear traffic (i.e., excess capacity) are referred to as spare segments. Spare segments that are currently connected to another to form a span are referred to as a spare span. Restoral routes are implemented by identifying spare segments and incorporating certain of those spare segments into the network. Telecommunications carriers desire to use restoral routes that minimize costs and that can be implemented rapidly when a network failure is detected. Telecommunications carriers typically consider the quality, capacity, and length of a restoral route as an indication of the cost of the restoral route. However, other costs, such as switching costs and fragmentation costs, are typically not considered. In general, it is desirable to reduce the number of connections and disconnections (i.e., actions) when bypassing a failure. The number of connects and disconnects increases the time needed to implement a restoral route. Also, since an attempted connect or disconnect can fail, it is also desirable to reduce the number of connects and disconnects to reduce the chance of the implementation of the restoral route failing. Switching costs are the costs associated with switching a restoration node to disconnect the failed segment and to connect spare segments to the non-failed active segments. Fragmentation costs are costs associated with using only a certain portion of a long spare span as part of the restoral route. Fragmentation of spans affects cost in a couple of ways. First, there is a current cost at the time of network failure associated with disconnecting a spare segment from a spare span so that the spare segment can then be connected as part of the restoral route. Second, there is a delayed cost associated with the disconnecting of the spare segment if the spare span could have been used in the future as part of the restoral route. The delayed fragmentation cost occurs because additional connections in the future may need to be created to build a restoral route to bypass a failure that the long spare span could have bypassed before it was fragmented.

SUMMARY OF THE INVENTION

The present invention provides a method and system for identifying spare segments to be used in the implementation of a restoral route. The restoration system of the present invention selects various spare spans and assigns a cost to each spare span based on connections that need to be created and destroyed when using the spare span and fragmentation that occurs when the spare span is disconnected from a longer spare span. The restoration system then identifies various combinations of the selected spare spans that can be used as the restoral route. The restoration system identifies the combination with the lowest assigned costs as the restoral route to bypass a network failure.

More specifically, the restoration system identifies a restoral route of a communications network following a failure. The communications network has segments and switching nodes that connect one segment to another. The segments are either active or spare. An active segment is configured to carry signals, and a spare segment is configured to not carry signals. The spare segments are interconnected by the switching nodes to form spans. The restoration system first identifies parent spare spans within the communications network. A parent spare span comprises one or more interconnected spare segments that are not interconnected to another segment. The restoration system, for each identified parent spare span, identifies each child spare span. A child spare span is a sub-span of the parent spare span. The restoration system then assigns a cost to each identified parent spare span and child spare span. When a failure is detected in an active segment, the restoration system selects a restoration plan for the failed active segment. The restoration plan designates the switching nodes that can be used to bypass the failed active segment. The restoration system then determines a combination of the identified parent spare spans and identified child spare spans based on the assigned costs that can be used to implement the selected restoration plan. The restoration system then implements the restoration plan to bypass the failed active segment.

BRIEF DESCRIPTION OF THE DRAWINGS

FIG. 4 illustrates the results of a cost analysis for the parent spare spans and child spare spans of the example network.

DETAILED DESCRIPTION OF THE INVENTION

The present invention provides a method and system for efficiently selecting and implementing a restoral route in the event of a communications network failure. The restoration system of the present invention selects a restoral route based on costs associated with various segments of possible restoral routes. The cost of a segment represents the contribution of that segment to the total cost of a restoral route. The restoration system preferably pre-calculates the costs associated with the segments. When calculating the costs, the restoration system takes into consideration both switching costs and fragmentation costs. When a network failure occurs, the restoration system selects the restoral route that has the lowest overall cost to bypass the failure. Because the costs of the segments are pre-calculated, the lowest costs restoral route can be rapidly determined when a failure is detected. Because of the dynamic nature of communications networks, various segments of the communications network may be unavailable at any given time to be part of a restoral route. Such unavailability may result from network reconfigurations, network maintenance, or network failure. Thus, the restoral route with the lowest overall cost to bypass a certain failure cannot necessarily be identified in advance.

The restoration system is divided into two phases. In the first phase, the restoration system assigns a cost to each spare segment and to each spare span of segments. The restoration system identifies all the spare spans and then identifies each sub-span of each spare span. The sub-spans are referred to as child spans of a parent span. For example, a spare span that comprises three segments is a parent span that has five child spans. The child spans include each of the three segments by themselves and include the sub-span formed by the first and second segments and the sub-span formed by the second and third segments. The cost of each parent and child span includes the switching cost, which generally decreases as its length increases. This decreasing cost results from the fewer number of connections needed to implement long restoral routes. Also, the cost of the child spans includes the fragmentation costs. In the second phase, when the restoration system detects a failure, it uses the pre-calculated cost information to identify the least costly restoral route. Because the restoral route is identified after a failure is detected, the restoration system can select the lowest cost restoral route based on the then-current network configuration. Also, since the costs are pre-calculated the overhead of determining the costs can be avoided when a network failure is detected.

Figure 1:
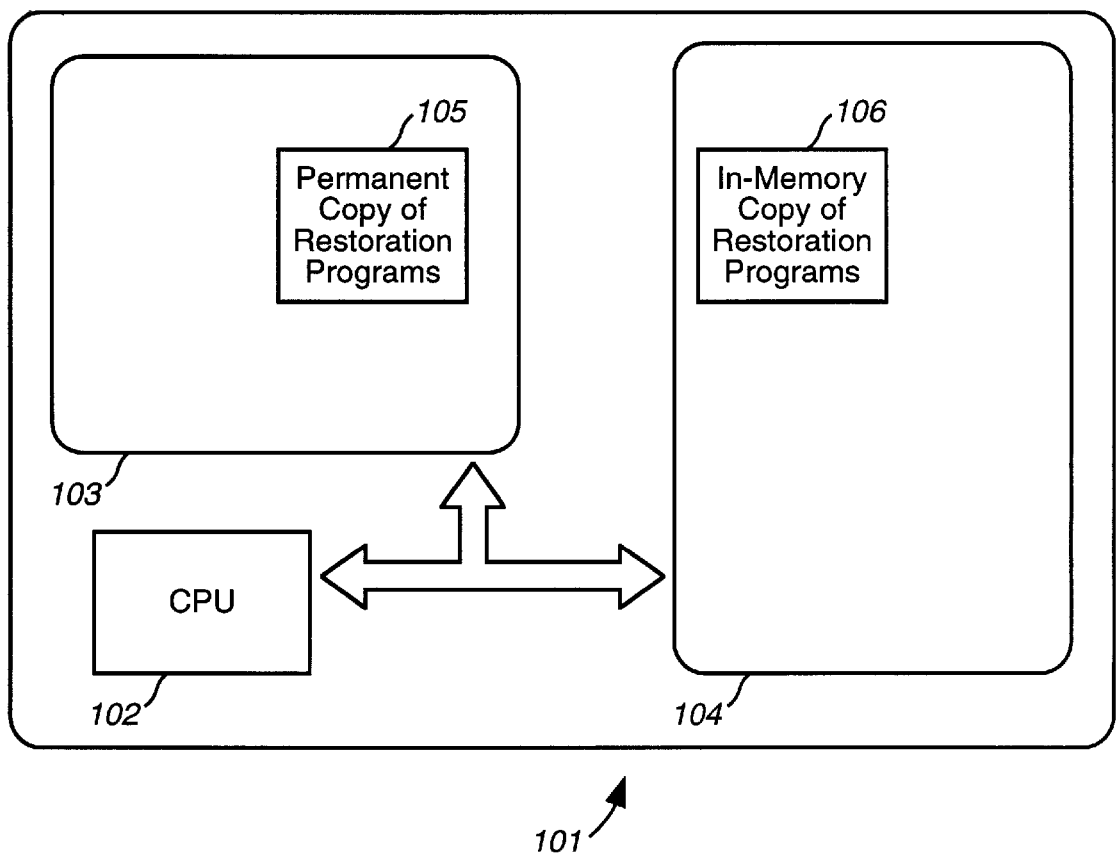
FIG. 1 illustrates a block diagram of a computer system on which the restoration system may be implemented.

The restoration system comprises one or more computer programs that are executed on a computer system. FIG. 1 displays a block diagram of such a computer system. The computer system 101 includes a central processing unit (CPU) 102, a computer-readable storage device 103 (e.g., a hard disk), and a main memory 104. A permanent copy of the programs 105 of the restoration system are stored on the storage device. Prior to execution of these programs, an entire program, or portion thereof, is transferred to form an in-memory copy of the programs 106. The CPU then fetches instructions from the in-memory copy and executes those instructions.

Figure 2:
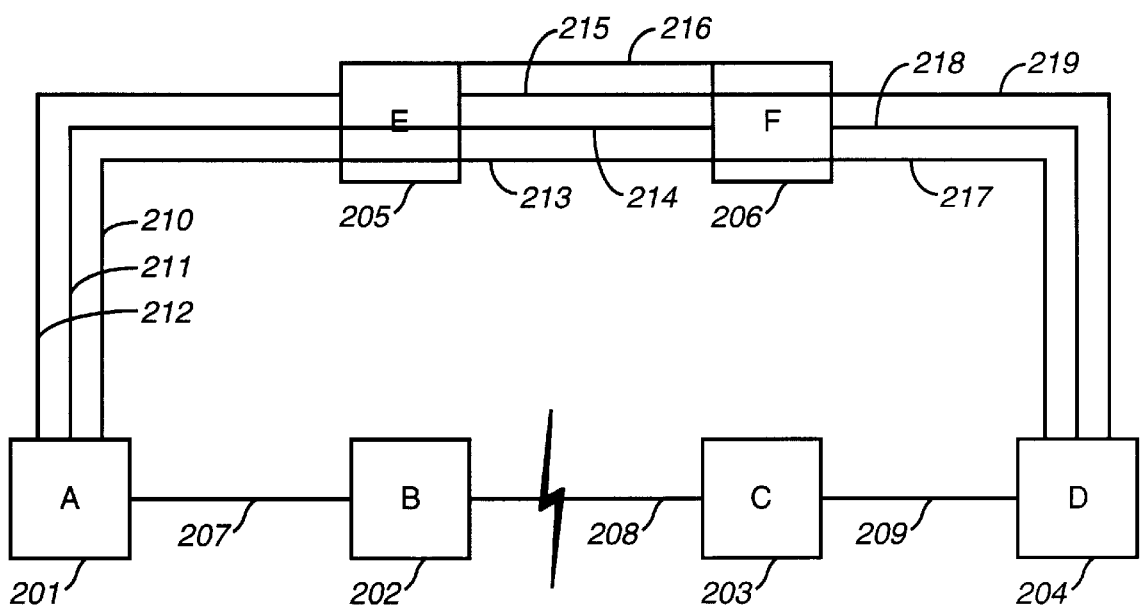
FIG. 2 illustrates an example communications network.

FIG. 2 illustrates an example communications network that is used to illustrate the present invention. This example communications network comprises restoration nodes A–F, 201–206, active segments 207–209, and spare segments 210–219. The original route begins at restoration node A, traverses active segments 207–209 and restoration nodes B and C, and ends at restoration node D. Segments joined together by lines passing through restoration nodes (e.g., segments 211 and 214) are connected by the restoration node into a span. Segments that end at a restoration node boundary (e.g., segment 212 that ends at node E) are not connected to another segment through that node. The lightning bolt-shaped line through segment 208 indicates that a failure has been detected on that segment.

The restoration system assigns costs to each span and to each sub-span (i.e., child span). The cost represents the overhead of using that span in a restoral route. Thus, spans with lower costs are preferred over spans with higher costs. For example, the span comprising segments 210, 213, and 217 may have a lower cost than the combination of spans that includes segment 212 and the span comprising segments 215 and 219. Since the span comprising segments 210, 213, and 217 is already connected at restoration nodes A and D, no additional connections are necessary. Conversely, the combination of spans will require a connection at restoration node E. Because of this connection, the cost of the combination of spans is increased. Thus, assuming that all other factors (e.g., capacity, quality, and cost of a connection) are equal, then the restoration system selects the spans that require fewer connections when building a restoral route. Once costs have been assigned to each span and sub-span, then when a failure is detected, the restoration system builds a restoral route that has the least overall cost.

Figure 3:
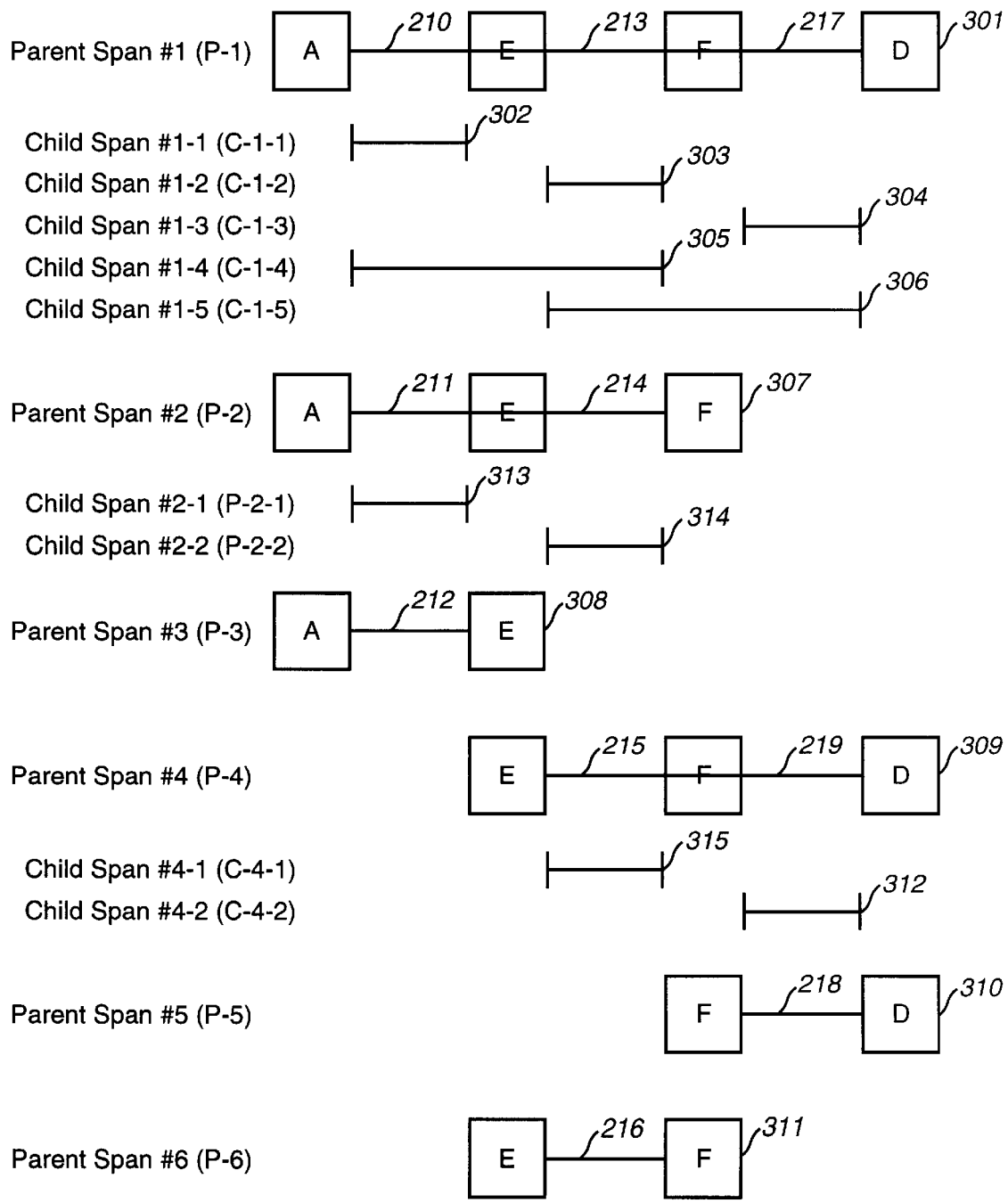
FIG. 3 illustrates the spare spans and child spans for the example network.

In the first phase, which is performed prior to the detection of any failure, the restoration system pre-calculates the costs associated with the various spare spans that can be used to build a restoral route. The restoration system first identifies all possible parent spare spans and child spare spans within the originally configured network and assigns a cost to each spare span. The parent spare spans are defined as spans such that both ends of the span are not connected to other segments. Child spare spans are sub-spans of a parent spare span that include fewer spare segments than the parent spare span. A parent spare span may comprise a single segment, in which case the parent spare span has no child spans. A child spare span may also comprise a single segment FIG. 3 illustrates the parent spare spans and child spare spans for the example communications network. Spare segments 210, 213, and 217 of the example communications network compose a single parent spare span 301 that connects restoration node A to restoration node D. That parent spare span is labeled as parent span 1. Below parent span 1 are listed the child spans contained within parent span 1. The first child span 302 is a spare segment 210 between restoration node A and restoration node E. The second child span 303 is a spare segment 213 between restoration node E and restoration node F. The third child span 304 is a spare segment 217 between restoration node F and restoration node D. The fourth child span 305 comprises the spare segment 210 between restoration node A and restoration node E and the spare segment 213 between restoration node E and restoration node F, which are connected via restoration node E. The fifth child span 306 comprises the spare segment 213 between restoration node E and restoration node F and the spare segment 217 between restoration node F and restoration node D, which are connected via restoration node F. Parent spare span 301 is designated "p-1" (i.e., "p" represents "parent span") and its five child spare spans 302–306 are designated "c-1-1," "c-1-2," "c-1-3," "c-1-4," and "c-1-5," respectively (i.e., "c" represents "child span"). The original network configuration has five additional parent spare spans, shown in FIG. 3 as parent spare spans 307–311, designated "p-2" through "p-6." The child spare spans 309–315 corresponding to each of these additional parent spare spans are shown below their corresponding parent spare spans, along with their designated names.

Once the restoration system identifies the parent spare spans and child spare spans in the original network configuration, it assigns costs to each. The cost associated with a spare span represents its cost contribution to the total cost of a restoral route that includes that spare span. The total cost of a restoral route represents the sum of the costs of the spare spans that compose that restoral route. The total cost for restoral route j is represented by the following formula:

$$total\ cost_j = \sum_{j=1}^{N} cost_j$$

where N is the number of spare spans in the restoral route and cost is the cost of the $i^{th}$ spare span of the restoral route.

A number of different costing algorithms may be used. In general, the algorithms take into account the length of the spans, the number of actions (e.g., creating a connection and destroying a connection) needed in order to implement the span, and the resulting fragmentation. An example formula for calculating the cost of a parent spare span is:

$$cost_i=(Max\_length * 100)-[(Parent\_length-1) * 100]$$

where Parent_length is the number of segments of the parent spare span, where Max_length represents the maximum expected number of segments for the longest span, and where 100 represents the cost of connecting a segment. This parent cost formula uses a maximum cost for a parent span (i.e., Max_length*100). The maximum cost represents the cost of establishing a restoral route by connecting the maximum number of spare segments. The cost of a parent spare span reduces as its length increases. Thus, the cost of the parent spare span is the maximum cost minus a number that is proportional to the length of the parent spare span (i.e., [(Parent_length-1)* 100]). This parent cost formula results in a cost that is greater than 0, but less than the maximum cost. An example formula for calculating the cost of a child spare span is:

$$cost_i=(Max\_length * 100)-[(Child\_length-1) * 100]+[(Parent\_length-Child\_length) * 2]+(if\ child=middle,\ 1;\ else\ 0)$$

where Child_length is the number of segments of the child spare span and where the Parent_length is the length of the parent spare span that contains the child spare span. This child cost formula uses a base cost that is similar to the cost for a parent spare span and increases that base cost to reflect a short child spare span of a long parent spare span and further increases that base cost if the child spare span occurs in the middle of the corresponding parent span. Computation of child costs by this formula causes a short child span of a short parent span to have a lower cost than the same short child spare span of a long parent span. Thus, long parent spans tend to be preserved, while short parent spans are used for their component child spans. Furthermore, a child span at either end of a parent spare span will have a lower cost than a child span in the middle of a parent spare span because the parent spare span will be fragmented into two spans in addition to the child span if a middle child span is selected. Thus, the cost of fragmenting a span into three sub-spans is higher than fragmenting into only two sub-spans.

FIG. 4 displays the results of a cost analysis for the identified parent spare spans and child spare spans from FIG. 3. For this example, the above cost formulas have been somewhat modified in order to produce smaller overall costs, and are displayed as formula 407 and formula 408. The results of the cost analysis are stored in cost table 401. Each row of the cost table contains the computed cost for a particular parent spare span or child spare span. Column 402 contains the designated name for a parent spare span or a child spare span. Column 403 contains the length, in segments, of a parent spare span or of the parent spare span of a child spare span. Column 404 contains the length of child spare spans. There is no entry in column 404 for parent spare spans. Column 405 contains a Boolean value indicating whether a child spare span is in the middle of a parent spare span or is at one or the other ends. There is no entry in column 405 for parent spare spans. Finally, column 406 contains the costs for parent and child spare spans computed from formulas 407 and 408, respectively The restoration system outputs the cost table as the result of the first phase.

In the second phase, the restoration system identifies a restoral route when a network failure is detected based on the information in the cost table. When a network failure occurs, the restoration system identifies and retrieves a restoration plan that was prepared to handle that particular network failure. For the purposes of the present invention, exactly how that restoration plan is determined is immaterial. The restoration plan will typically identify the nodes through which a restoral route should be built. The restoration plan may also include alternative nodes that can be used if a restoral route cannot be built through the identified nodes. It is assumed that, for any given communications network component failure, a restoration plan has been devised and stored in a form that can be easily retrieved following failure of that component. The restoration plan is typically derived using capacity, quality, and length as an indication of cost. The restoration system then analyzes the retrieved restoration plan along with the cost table that was generated in the first phase to identify the lowest cost restoral route.

The restoration system first determines the various combinations (i.e., a restoral route) of parent spare spans and child spare spans that can be used to implement the retrieved restoration plan. The restoration system then calculates the cost for implementing each combination of spans using the cost table. The restoration system selects that combination of parent spare spans and child spare spans with which the restoration plan can be implemented for the least possible cost. If there are more than one such combination of parent spare spans and child spare spans with the minimum cost, then the restoration system selects one of the equally least costly combinations.

Figure 5:
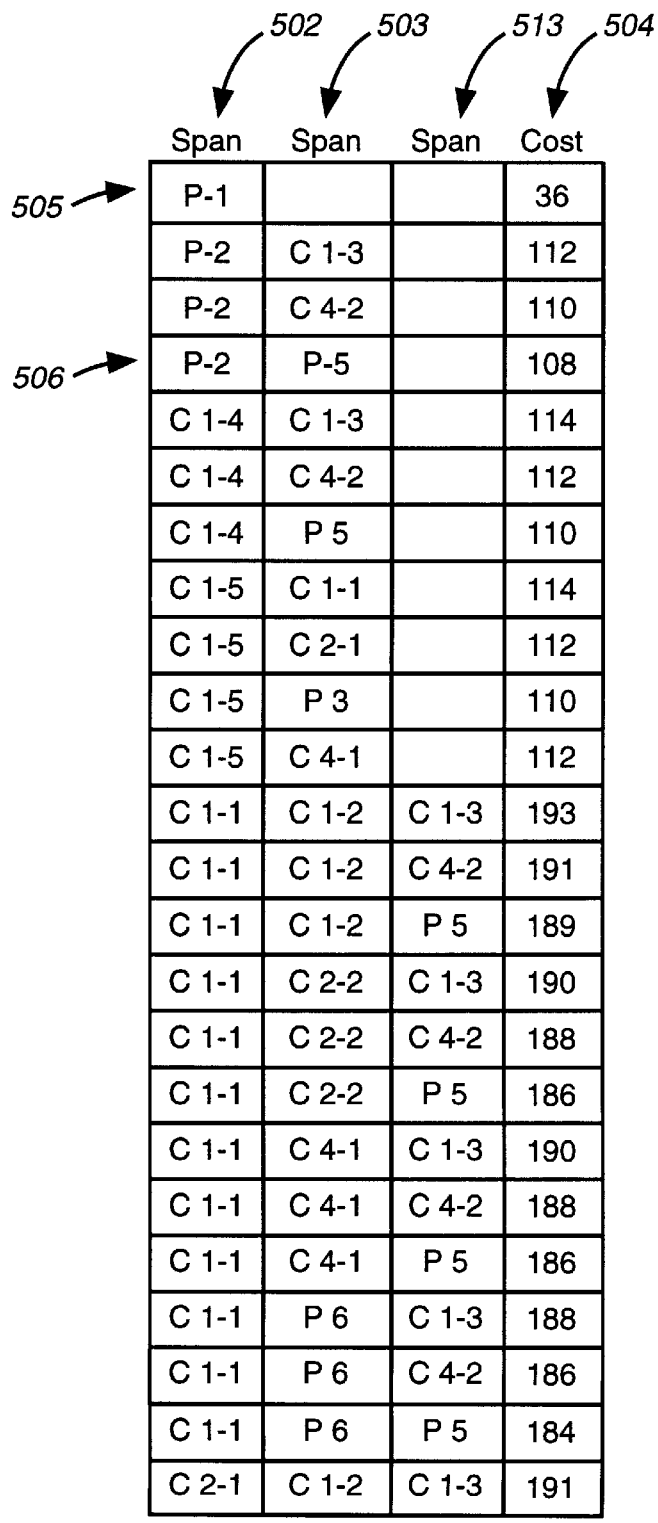
FIG. 5 illustrates the combinations of parent spare spans and child spare spans that can be used to implement the restoral route for the example network.

The cost of implementing the restoration plan with a combination of spare parent spans and child spare spans is the sum of the costs of each parent spare span and child spare span in the combination. FIG. 5 contains a restoral route table of every possible combination of parent spare spans and child spare spans that can be used to implement a restoration plan to bypass segment 208 of the example communications network. The restoration plan begins at restoration node A, and traverses restoration nodes E and F, and ends at restoration node D. Each row of the restoral route table describes one combination of parent spare spans and child spare spans that implement the restoration plan. Each combination comprises one, two, or three spare spans, the designations for which appear in columns 502–503. The computed cost for implementing the combination of spans appears in column 504. For example, row 505 represents a combination comprising only parent spare span "p-1" having a cost of 36. This cost was derived from row 409 and column 406 of the cost table. As another example, row 506 represents the combination comprising parent spare span "p-2" and parent spare span "p-5" having a total cost 108. This cost was derived by adding the cost of parent spare span "p-5" listed in row 411 and column 406 of the cost table to the cost of parent spare span "p-2" listed in row 410 and column 406 of the cost table. In similar fashion, costs are listed in the restoral route table 501 for all possible combinations of parent spare spans and child spare spans from which the restoration plan can be implemented. The restoration system can identify the least costly restoral route without actually generating the restoral route table. The restoration system need only enumerate all combinations and preserve an indication of the least costly combination enumerated so far.

Figure 6:
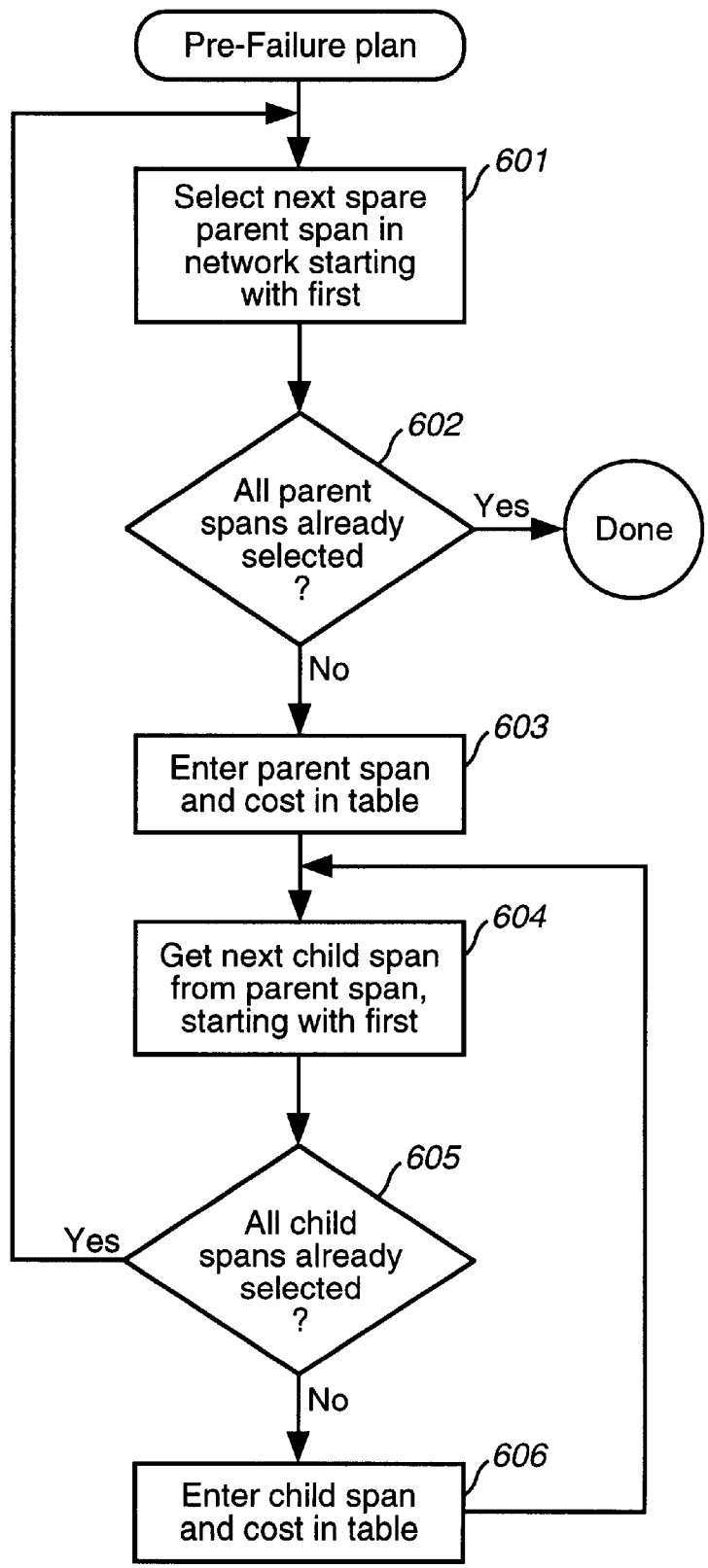
FIG. 6 is a flow control diagram of a computer program which implements the first phase of the restoration system.

FIG. 6 is a flow control diagram for the computer program "Pre-failure Plan," which implements the first phase. The program analyzes the original network configuration and generates the cost table. In step 601, the program selects the next parent spare span from the original communications network configuration, starting with the first parent spare span. In step 602, if all parent spare spans have already been selected, then the program is done, else the program continues at step 603. In step 603, the program computes the cost of the parent spare span and enters the computed cost along with a designation of the parent spare span into a cost table. The program may, in addition, enter the intermediate data that is used to compute the costs into the cost table, including the length of the parent spare span. Then, in steps 604–606, the program identifies each child spare span that is part of the selected parent spare span. In step 604, the program identifies the next child spare span that occurs in the selected parent spare span, starting with the first. In step 605, if all the child spare spans have already been identified, then the program loops to select the next parent spare span in step 601, else the program continues at step 606. In step 606, the program enters the computed cost of the identified child spare span, along with a designation of the child spare span into the cost table and loops to step 604 to select the next child spare span.

Figure 7:
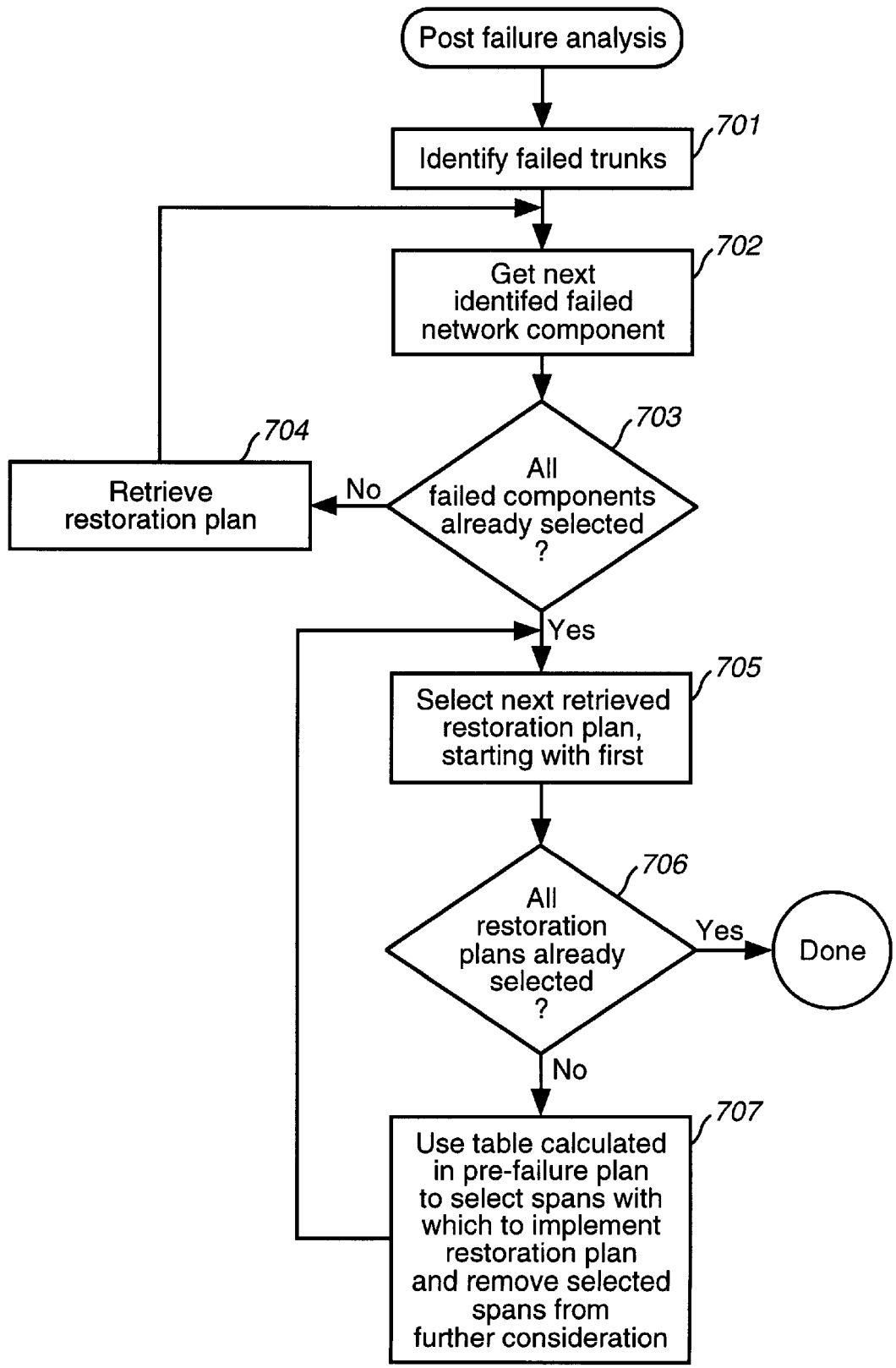
FIG. 7 is a flow control diagram of a computer program that implements the second phase of the restoration system.

FIG. 7 is a flow control diagram for the computer program "Post-failure Analysis," which implements the second phase of the restoration system. In one embodiment, the restoration system executes on a centralized system that receives various alarms from the communications network. The restoration system analyzes the alarms to determine whether a network failure has occurred or whether the alarm is a result of noise or some transient fault. If a network failure has occurred, then the restoration system identifies all impacted active and spare segments. The restoration system then performs steps 701–707 for each impacted active segment to select the lowest cost restoral route. The impacted spare segments are removed from consideration as part of a restoral route. Also, each spare segment that is selected for a restoral route is removed from consideration in other restoral routes. In step 701, the program identifies all of the failed active segments. In steps 702–707, the program loops selecting restoration plans for all the identified failed active segments and selecting a combination of parent spare spans and child spare spans as a restoral route. In step 702, the program selects the next identified failed active segment. In step 703, if all the failed active segments have already been selected, then the program continues at step 705, else the program continues at step 704. In step 704, the program identifies the restoration plan for the selected failed active segment and loops to step 702 to select the next failed active segment. In step 705, the program selects the next identified restoration plan starting with the first. In step 706, if all the restoration plans have already been selected, then the program is done else the program continues at step 707. In step 707, the program uses the cost table calculated by the program "Pre-failure Plan" to select the least costly combination of parent spare spans and child spare spans with which to implement the identified restoration plan. The program then removes those parent spare spans and child spare spans in the selected combination from further consideration to prevent them from being selected in subsequent executions of step 707. The result of the program is a complete list of the parent spare spans and child spare spans that are to be incorporated into the communications network in order to bypass the failed active segments.

Several different techniques can be used to select the spare segments to implement a restoration plan. For example, the restoration system could start at one end node of the restoration plan and select the least costly spare span to connect to that end node. The restoration system would then select the node at the end of the spare span and repeat this process until the restoral route is complete. Alternatively, the restoration system could initially select the lowest cost spare span that can be used as any portion of the restoral route. The restoration system could then repeat the process of selecting the lowest cost spare span for each portion of the restoral route for which a span is not yet selected. This process would be repeated until spare spans are selected for the entire restoral route. The restoration system could also select the least costly combination of spare spans as the restoral route. However, the computations needed to make such a selection increase exponentially and are thus impractical for all but the simplest of network configurations.

In addition to the first and second phases of the described above, the restoration system may implement the restoral routes by sending appropriate messages to the appropriate restoration nodes to connect those parent spare spans and child spare spans identified in the second phase. Thus, the restoration system may comprise: (1) identifying and assigning of a cost to each parent spare span and child spare span in the originally configured communications network; (2) using the identified parent spare spans and child spare spans and costs to determine a combination of parent spare spans and child spare spans with which to implement a restoral route to bypass one or more failed active segments in the communications network; and (3) automatically signaling the appropriate restoration nodes to incorporate the restoral routes to bypass the failures.

Although the present invention has been described in terms of one embodiment, it is not intended that the invention be limited to this embodiment Modifications within the spirit of the invention would be apparent to those skilled in the art. For example, the present invention can be used to identify optimal implementations of routes for any type of communications network (e.g., Internet or other computer-based network). The scope of the present invention is defined by the claims that follow.

I claim:

1. A method in a computer system for determining a restoral route of a communications network following a failure, a communications network having segments and switching nodes that connect one segment to another, the segments being active or spare, the active segments being configured to carry signals and the spare segments being configured to not carry signals, the spare segments being interconnected by the switching nodes to form spans, the method comprising:

identifying parent spare spans within the communications network, each parent spare spans comprising one or more interconnected spare segments that are not interconnected to another segment;

for each identified parent spare span, identifying each child spare span, each child spare span being a sub-span of the parent spare span;

assigning cost to each identified parent spare span and child spare span, wherein the assigning of costs occur before detection of a network failure and identification of various combinations of parent spare spans and child spare spans occurs after detection of a network failure; and when a failure is detected in an active segment,
  selecting a restoration plan for the failed active segment, the restoration plan designating the switching nodes that can be used to bypass the failed active segment; and
  determining a combination of the identified parent spare spans and identified child spare spans based on the assigned costs that can be used to implement the selected restoration plan.

2. The method of claim 1 wherein the assigning of the cost includes determining a length of each identified parent spare span and child spare span and a number of actions required to configure each identified parent spare span and child spare span to bypass the failure.

3. The method of claim 1 wherein the assigning of the cost includes calculating a switching cost associated with spare spans.

4. The method of claim I wherein the assigning of the cost includes calculating a fragmentation cost associated with a child spare span.

5. A method in a computer system for restoring a communications network following a failure, the communications network having active segments that carry signals between switching nodes and having spare segments that can be activated to carry signals between switching nodes, the method comprising:

identifying spare spans within the communications network, a spare span comprising one or more interconnected spare segments;

assigning a cost to each identified spare span, the cost being based on the number of connections in the spare span, wherein the assigning of cost occurs before detection of a network failure and identification of various combinations of spare spans occurs after detection of a network failure; and following a failure of an active segment within the communications network,
  selecting a combination of spare spans to bypass the failed active segment based on the assigned costs to the spare spans; and
  connecting the selected combination of spare spans to bypass the failed active segment.

6. The method of claim 5 wherein the identifying of spare spans identifies each parent spare span, which comprises one or more interconnected spare segments that are not interconnected to another segment, and identifies each child spare span, which are sub-spans of the parent spare spans.

7. The method of claim 5 wherein the assigning of the cost includes assigning a cost based on resulting fragmentation of spare spans.

8. The method of claim 7 wherein the costs include the cost of disconnecting a sub-span from a spare span.

9. The method of claim 7 wherein the costs include a delayed cost of connecting a segment to a fragmented spare span.

10. A computer system for identifying a restoral route in a communications network to bypass a segment within the communications network, the communications network having active segments that carry signals between switching nodes and having spare segments that can be patched into the network to carry signals between switching nodes, the system comprising:

a component that identifies parent spare spans and child spare spans within the communications network;

a component that assigns a cost to each identified parent spare span and child spare span, wherein the assigning of costs occur before detection of a network failure, and identification of various combinations of parent spare spans and child spare spans occurs after detection of a network failure; and a component that selects a combination of the identified spare spans to bypass the segment based on the assigned costs.

11. The system of claim 10 wherein a parent spare span comprises one or more interconnected segments that are connected only to the segments within the span and wherein a child spare span is a sub-span of a parent spare span.

12. The system of claim 10 wherein the costs are assigned based on the number of connections in the span.

13. The system of claim 10 wherein the costs are assigned based on fragmentation of a long spare span into shorter spare spans.

14. The system of claim 13 wherein the cost of fragmentation includes the cost of disconnecting a short spare span from a long spare span.

15. The system of claim 13 wherein the cost of fragmentation includes a delayed cost of connecting a fragmented long span to another segment.

16. The system of claim 10 including a component that patches the selected combination of spare spans into the communications network to bypass a failure.

17. The system of claim 10 wherein the component that selects the combination does so in response to detecting a network failure.

18. A method in a computer system for identifying a restoral route, the method comprising selecting a plurality of spare spans; assigning a cost to each spare span based on fragmentation that occurs when the spare span is disconnected from a longer spare span; identifying various combinations of the selected spare spans that can be used as the restoral route; and identifying the combination with the lowest assigned costs as the restoral route wherein the assigning of costs occur before detection of a network failure, and the identification of various combinations of spare spans occurs after detection of a network failure said identification identifying all possible combinations of said spare spans.

\* \* \* \* \*